(12) United States Patent
Chalapuradudi Bandigowda et al.

(10) Patent No.: US 10,401,802 B2
(45) Date of Patent: Sep. 3, 2019

(54) SCALABLE ARCHITECTURE FOR A HUMAN MACHINE INTERFACE DEVICE

(71) Applicant: Siemens Aktiengesellschaft, Munich (DE)

(72) Inventors: Anandkumar Chalapuradudi Bandigowda, Karnataka (IN); Suneesh Puthiyonnan, Kerala (IN)

(73) Assignee: Siemens Aktiengesellschaft, Munich (DE)

( * ) Notice: Subject to any disclaimer, the term of this patent is extended or adjusted under 35 U.S.C. 154(b) by 515 days.

(21) Appl. No.: 13/753,835

(22) Filed: Jan. 30, 2013

(65) Prior Publication Data
US 2013/0204407 A1    Aug. 8, 2013

(30) Foreign Application Priority Data
Feb. 3, 2012   (EP) .................... 12153798

(51) Int. Cl.
*G05B 11/01*     (2006.01)
*G05B 19/05*     (2006.01)
*G05B 19/042*    (2006.01)

(52) U.S. Cl.
CPC .......... *G05B 11/01* (2013.01); *G05B 19/0421* (2013.01); *G05B 19/052* (2013.01); *G05B 2219/23081* (2013.01); *G05B 2219/25315* (2013.01); *G05B 2219/25454* (2013.01)

(58) Field of Classification Search
None
See application file for complete search history.

(56) References Cited

U.S. PATENT DOCUMENTS

| | | | | |
|---|---|---|---|---|
| 5,131,092 A | * | 7/1992 | Sackmann | G06F 13/128 700/18 |
| 6,587,739 B1 | * | 7/2003 | Abrams et al. | 700/83 |
| 7,835,805 B2 | | 11/2010 | Hood et al. | |
| 2003/0005099 A1 | * | 1/2003 | Sven | H04L 41/06 709/223 |
| 2007/0283260 A1 | | 12/2007 | Sun | |
| 2008/0062625 A1 | * | 3/2008 | Batio | 361/680 |
| 2011/0153034 A1 | | 6/2011 | Philliben et al. | |

FOREIGN PATENT DOCUMENTS

EP   1 865 410   12/2007
EP   1 906 276   4/2008

* cited by examiner

*Primary Examiner* — Sean Shechtman
(74) *Attorney, Agent, or Firm* — Cozen O'Connor

(57) ABSTRACT

A human-machine interface device suitable for use in an automation system comprising a plurality of the human-machine interface devices, where each human-machine interface device includes at least one hardware resource, a system bus, and an interconnect circuit and is configured for interconnecting with at least one other human-machine interface device to form a device cluster, where the interconnect circuit provides a communication channel between individual system bus in each human-machine interface device forming the device cluster.

14 Claims, 7 Drawing Sheets

FIG 2B

| PIN NUMBER | PIN Description |
|---|---|
| 1 | Ground |
| 2 | Multiplexed Address/Data 0 |
| 3 | Multiplexed Address/Data 1 |
| 4 | Multiplexed Address/Data 2 |
| 5 | Multiplexed Address/Data 3 |
| 6 | Multiplexed Address/Data 4 |
| 7 | Multiplexed Address/Data 5 |
| 8 | Multiplexed Address/Data 6 |
| 9 | Multiplexed Address/Data 7 |
| 10 | Multiplexed Address/Data 8 |
| 11 | Multiplexed Address/Data 9 |
| 12 | Multiplexed Address/Data 10 |
| 13 | Multiplexed Address/Data 11 |
| 14 | Multiplexed Address/Data 12 |
| 15 | Multiplexed Address/Data 13 |
| 16 | Multiplexed Address/Data 14 |
| 17 | Multiplexed Address/Data 15 |
| 18 | Reserved for future use |
| 19 | Reserved for future use |
| 20 | Reserved for future use |
| 21 | Reserved for future use |
| 22 | Reserved for future use |
| 23 | Reserved for future use |
| 24 | Control Signal 0 |
| 25 | Control Signal 1 |
| 26 | Control Signal 2 |
| 27 | Control Signal 3 |
| 28 | Interrupt 0 |
| 29 | Interrupt 1 |
| 30 | Interrupt 2 |
| 31 | Interrupt 3 |
| 32 | Ground |

SCALABLE ARCHITECTURE FOR A HUMAN MACHINE INTERFACE DEVICE

BACKGROUND OF THE INVENTION

1. Field of the Invention

The present invention generally relates to human-machine-interface (HMI) devices and, more particularly, to scalable architecture for an HMI device.

2. Description of the Related Art

Industrial automation systems are based on designing, implementing, and monitoring control systems using specific data processing systems, such as programmable logic controllers. Programmable logic controllers are special computing devices that are commonly used for synchronizing the flow of inputs from sensors with the flow of outputs to actuators based on a programming logic deployed on the programmable logic controllers.

In order to reduce the load on these programmable logic controllers, the industrial automation systems have further specific devices, which provide an interface to operating personnel. These are referred to as control and monitoring devices or Human Machine Interface (HMI) devices.

The term HMI device is a generic term covering all components associated with this group of devices, which can be stationary or mobile. One example is operator panels.

HMI devices are used in industrial automation systems to display and control process data related to industrial equipment and, hence, act as important aids for the operating personnel. This function is generally referred to as Supervisor Control and Data Acquisition (SCADA). To this end the HMI device generally has specific hardware, e.g., a touch-screen, and is specifically screened from environmental influences. Specific software is also operated therein. This provides functions, which enhance user-friendliness, quality and safety of operation by an operator. Thus, HMI devices can be used to visualize, control, configure, and generate interactive process maps related to the industrial equipment. On the one hand, this allows the selective display of responses of the industrial equipment, generally in the form of measured values and messages. On the other hand, the customized predefinition of control operations and data inputs allows the industrial equipment to be switched to required states.

Owing to various reasons, such as increasing business needs and ever-evolving safety, security, and regulatory requirements, an upgrade of legacy automation infrastructure is often required to match the increased performance requirements. In particular, HMI devices need such upgrades such that performance thereof might keep pace with increasing demands in view of expanding scale of operations. However, discarding legacy hardware and replacing them with new hardware involves huge capital investment and does not always provide a justifiable return-on-investment and, hence, acts as a significant deterrent. As a result, despite a strong requirement for better capabilities, often the industrial automation systems are not upgraded.

In light of the foregoing, there is a need for a system and a method for facilitating upgrade of hardware capabilities of an HMI device in a cost-effective manner.

SUMMARY OF THE INVENTION

It is therefore an object of the present invention to provide scalable architecture for an HMI device such that hardware capabilities thereof may be scaled up in a cost-effective manner.

This and other objects and advantages are achieved in accordance with the invention by providing a human-machine interface device with scalable architecture, an automation system based on said human-machine interface device, and a method of operating said automation system is provided.

In accordance with a first embodiment of the present invention, a human-machine interface device suitable for use in an automation system and configured for interconnection to another human-machine interface device is provided. The automation system comprises a plurality of the human-machine interface devices. Each human-machine interface device comprises one or more hardware resources and a system bus for providing a communication channel between the one or more hardware resources within the human-machine interface device. The human-machine interface device further comprises an interconnect circuit. The interconnect circuit comprises at least one interconnect port and means for providing communication channel between the interconnect port and the system bus. Each interconnect port is suitable for interconnecting the human-machine interface device to another human-machine interface device so as to form a device cluster. Thus, the human-machine interface device according to the present invention is configured for interconnection with one or more other human-machine interface devices so as to form a device cluster. Various hardware resources in the device cluster are controlled in a coordinated manner to achieve enhanced hardware capabilities in a cost-effective manner.

In accordance with an embodiment of the present invention, the means for providing a communication channel comprise an interconnect bus and an interconnect bridge. The interconnect bus provides a communication channel between one or more interconnect ports corresponding to the human-machine interface device. The interconnect bridge provides a communication channel between the interconnect bus and the system bus within the human-machine interface device. Thus, according to this technical feature a dedicated communication channel is provided between individual system buses of individual human-machine interface devices forming the device cluster and, thereby, desired communication is implemented in the hardware. This technical feature facilitates achieving fast inter-device communication.

In accordance with another embodiment of the present invention, the interconnect circuit is configured for communicating at least one of multiplexed address/data signals, controls signals, and interrupt signals. According to this technical feature, the interconnect circuit is configured to communicate various desired signals required for inter-device communication.

In accordance with another embodiment of the present invention, the human-machine interface device comprises a discovery module. The discovery module is configured for retrieving information related to the one or more hardware resources in one or more other human-machine interface devices in the device cluster. According to this technical feature, each human-machine interface device in the device cluster obtains information related to every other human-machine interface device forming the device cluster, which facilitates an arbitration process to configure one or more human-machine interface devices in a master mode and the remaining human-machine interface devices in a slave mode.

In accordance with another embodiment of the present invention, the human-machine interface device comprises an arbitration module. The arbitration module is configured for activating one of a master mode and a slave mode in the human-machine interface device such that one or more human-machine interface devices in the device cluster are configured in the master mode, and each of the remaining human-machine interface devices in the device cluster are configured in the slave mode. According to this technical feature, various human-machine interface devices functioning in the slave mode are controlled by the one or more human-machine interface devices functioning master mode. The arbitration module may be configured in any desired manner to achieve relative numbers of master and slave human-machine interface devices in the device cluster, as required.

In accordance with another embodiment of the present invention, each human-machine interface device comprises a control module. The control module is operable in a master mode for controlling one or more hardware resources on one or more human-machine interface device within the device cluster, and is further operable in a slave mode for receiving control signals from another control module operating in the master mode on another human-machine interface device within the device cluster. This technical feature facilitates functioning of various human-machine interface devices in the device cluster in one of the desired modes, that is, the master mode and the slave mode.

In accordance with another embodiment of the present invention, the human-machine interface device comprises a display module. The display module operable in a master mode for logically partitioning a graphical user-interface into two or more portions, and displaying individual portions on individual human-machine interface devices in the device cluster. According to this technical feature, display resolution of any user interface may be significantly increased to improve user experience.

According to a second embodiment of the present invention, an automation system comprising a plurality of human-machine interface devices with scalable architecture is provided. Each human-machine interface device comprises one or more hardware resources and a system bus for providing a communication channel between the one or more hardware resources within the human-machine interface device. The human-machine interface comprises an interconnect circuit, which in turn, comprises at least one interconnect port for interconnecting the human-machine interface device to at least one other human-machine interface device so as to form a device cluster, and means for providing a communication channel between the at least one interconnect port and the system bus. Thus, the present invention provides an automation system based on human-machine interface devices which may be grouped in device clusters to enhance the hardware capabilities, as may be required.

According to a third embodiment of the present invention, a method for operating an automation system is provided. The automation system comprises a plurality of human-machine interface devices. Each human-machine interface device comprises one or more hardware resources and a system bus providing a communication channel between the one or more hardware resources within the human-machine interface device. According to the method, at least one human-machine interface device is connected to at least one other human-machine interface device to form a device cluster and subsequently, a communication channel between system bus in each of the human-machine interface devices is established. Thus, the present invention provides a method for operating an automation system based on human-machine interface devices which may be grouped in devices clusters to enhance the hardware capabilities, as may be required.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which:

FIGS. 2A-2B illustrate an interconnect port and a table listing signal configuration on the interconnect port respectively in accordance with an embodiment of the present invention;

DETAILED DESCRIPTION OF THE PREFERRED EMBODIMENTS

Figure 1:
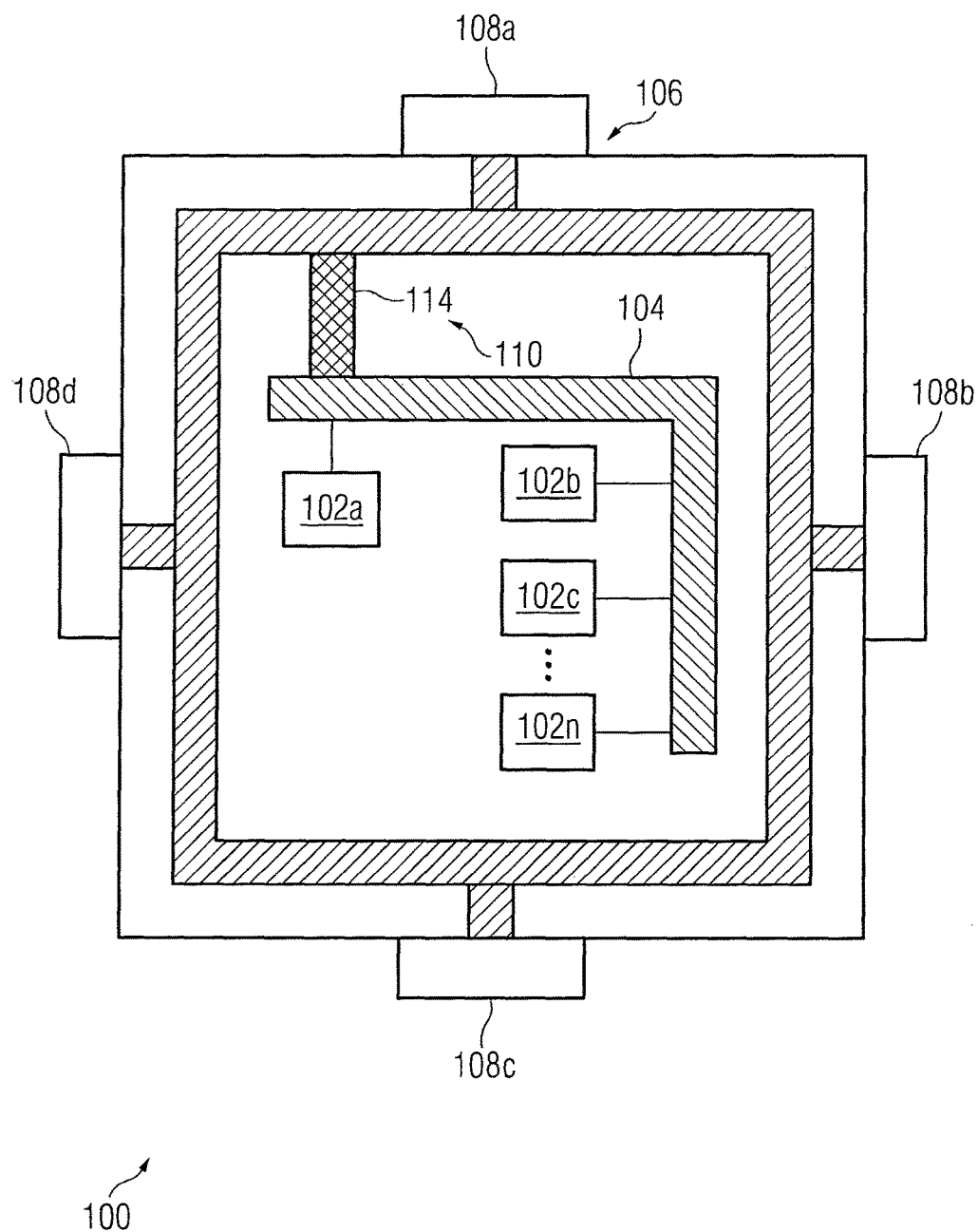
FIG. 1 illustrates a schematic representation of a human-machine interface device in accordance with an embodiment of the present invention.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Referring to FIG. 1, a schematic representation of a human-machine interface device 100 is illustrated in accordance with an embodiment of the present invention.

The human-machine interface device 100 includes one or more hardware resources 102*a* . . . 102*n*, a system bus 104, and an interconnect circuit 106. The interconnect circuit 106 includes one or more interconnect ports 108*a* . . . 108*d* and means 110 for providing a communication channel. The means 110 include an interconnect bus and interconnect bridge 114.

The hardware resources 102*a* through 102*n* correspond to hardware resources including but not limited to a processor, one or more memory modules (random-access memory, read-only memory, flash memory, and so on), various network interface cards, one or more graphics processors, and so on, which are typically included within an human-machine interface device, in accordance with the state-of-the-art.

The system bus 104 provides a communication channel between the hardware resources 102a through 102n within the human-machine interface device 100.

The interconnect circuit 106 is included as an integral part of the human-machine interface device 100. The interconnect circuit 106 serves to communicatively couple two or more human-machine interface devices 100 to achieve enhanced hardware capabilities.

As mentioned earlier, the interconnect circuit 106 includes one or more interconnect ports 108a, 108b, 108c, 108d. Each interconnect port 108a, 108b, 108c, 108d is suitable for interconnecting the human-machine interface device 100 to another human-machine interface device 100 to form a device cluster. Various exemplary configurations of the device cluster will be shown in FIGS. 4A through 4C.

It should be noted that in the exemplary embodiment shown in the adjoining figure, only four interconnect ports 108a, 108b, 108c, 108d have been shown. However, in practice any number of interconnect ports 108a, 108b, 108c, 108d may be provided on the human-machine interface device 100. Further, the geometrical orientation of the four interconnect ports 108a, 108b, 108c, 108d is only exemplary in nature.

In one embodiment of the present invention, two configurations of an interconnect port are available, namely, male configuration and female configuration. Thus, for example, female-configuration interconnect ports may form the interconnect port 108a and 108d and similarly, male-configuration interconnect ports may form the interconnect ports 108b and 108c. Further, based on the geometrical orientation of the interconnect ports 108a, 108b, 108c, 108d, it may be possible to physically plug two human-machine interface devices 100 such that a male-configuration interconnect port mates with a female-configuration interconnect port. Thus, for example, two human-machine interface devices 100 may be interconnected such that the interconnect port 108a on a first human-machine interface device 100 mates with the interconnect port 108c on a second human-machine interface device 100.

Figure 2A:
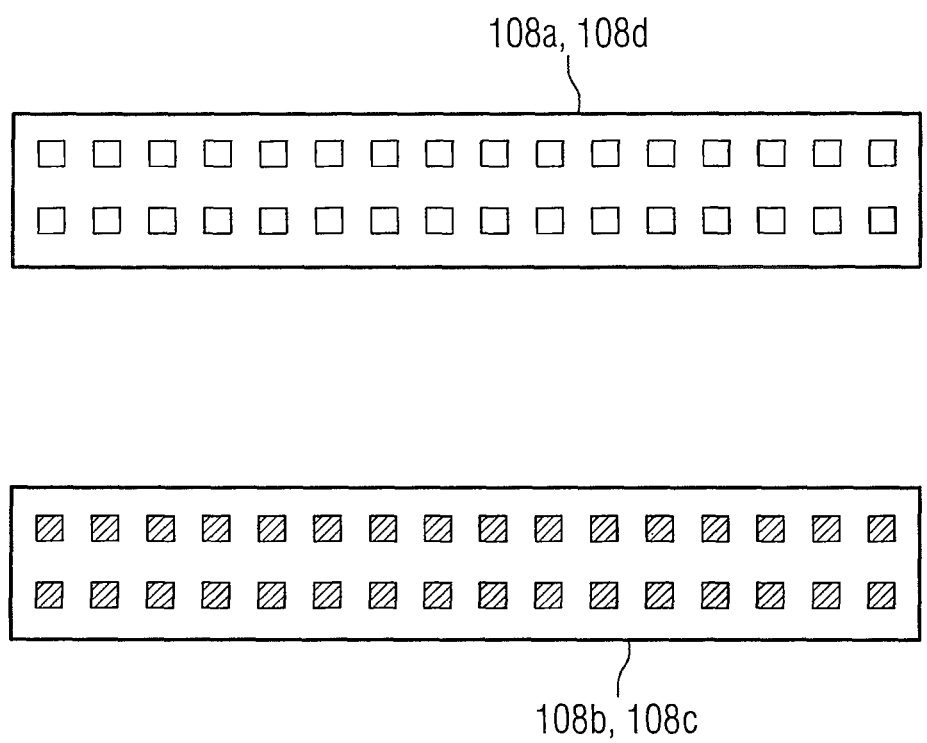

In an alternative embodiment of the present invention, as shown in FIG. 2A, two or more human-machine interface devices 100 may be interconnected using a wire jack (not shown). The wire jack may have ports at its two ends interconnected using a wire. The wire jack may have the two ports with male-configuration, or the two ports in female-configuration, or a first port in male-configuration and a second port in female-configuration. The wire jack may accordingly be connected to suitable interconnect ports 108a . . . 108d on the human-machine interface device 100. In an embodiment of the present invention, each interconnect port 108a . . . 108d on the human-machine interface device 100 is in female-configuration (or male-configuration) and the wire jack is configured with both ports in male-configuration (or female-configuration).

The interconnect circuit 106 also includes means 110. The means 110 provide a communication channel between the interconnect ports 108a . . . 108d and the system bus 104. In particular, the interconnect bus 112 providing a communication channel between one or more interconnect ports 108a . . . 108d corresponding to the human-machine interface device 100; and the interconnect bridge 114 provides a communication channel between the interconnect bus 112 and the system bus 104 within the human-machine interface device 100.

Thus, when two human-machine interface devices 100 are interconnected with each other, the interconnect circuit 106 provides the necessary communication channel between the system bus 104 of each human-machine interface device 100.

The interconnect circuit 106 is configured for communicating various signals that are typically communicated over the system bus 104. Thus, the interconnect circuit 106 is capable of communicating multiplexed address/data signals, controls signals, and interrupt signals. In an exemplary embodiment, the interconnect circuit 106 is configured to provide a 32-line communication channel between the system bus 104 of various human-machine interface devices 100 interconnected to form the device cluster. An exemplary configuration of the interconnect circuit 106 is depicted in a tabular manner in FIG. 2B. Thus, lines 2 through 17 act as multiplexed address/data lines, lines 24 through 27 act as control signal lines and so on.

Figure 3:
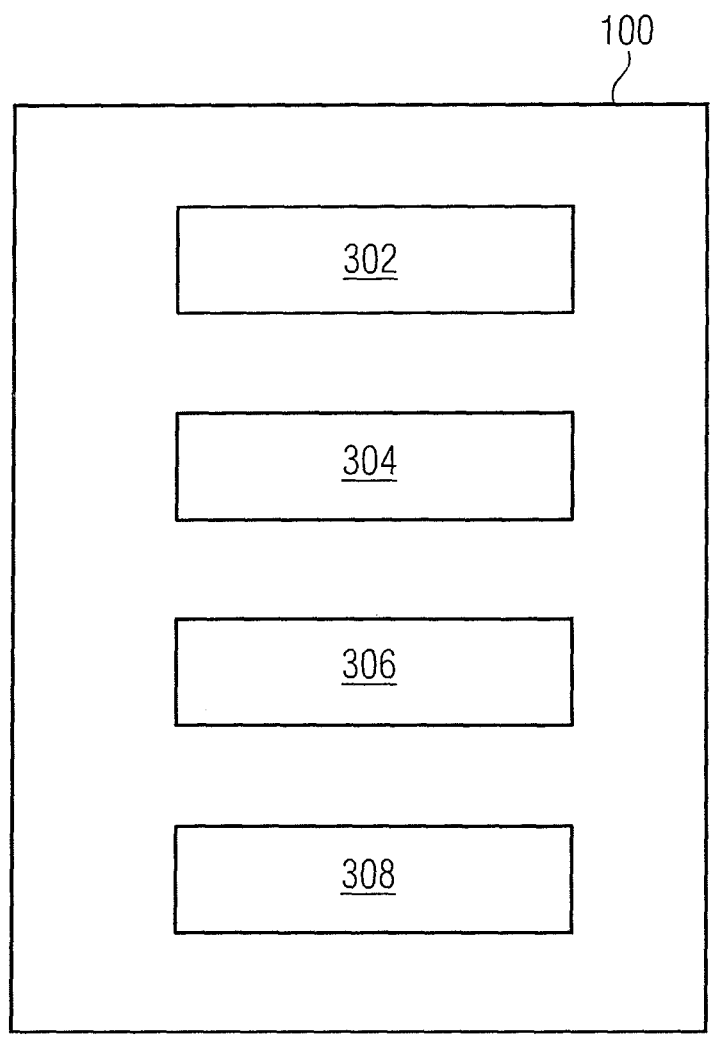
FIG. 3 illustrates a block diagram depicting a human-machine interface device in accordance with an embodiment of the present invention.

Referring to FIG. 3, a block diagram depicting a human-machine interface device is illustrated in accordance with an embodiment of the present invention.

The human-machine interface device 100 includes a discovery module 302, an arbitration module 304, a control module 306, and a display module 308.

The discovery module 302 is configured for retrieving information related to the hardware resources 102 in one or more other human-machine interface devices 100 in said device cluster. Thus, each human-machine interface device 100 fetches the information related to hardware resources on all other human-machine interface devices 100 included in the device cluster. This information is provided to the arbitration module 304.

The arbitration module 304 is configured for activating one of a master mode and a slave mode in the human-machine interface device 100. In one embodiment, the arbitration module 304 evaluates the hardware resources 102 native to the human-machine interface device 100 and the hardware resources 102 located on other human-machine interface devices 100, and accordingly, configures the human-machine interface device 100 in either the master mode or the slave mode. Such evaluation may take into account, for example, processor type and capacity, memory capacity or peripheral details. Thus, based on comparison between relative hardware capabilities of human-machine interface devices 100, one or more human-machine interface devices are configured in the master mode and remaining one or more human-machine interface devices are configured in slave mode such that there is at least human-machine interface device 100 configured in the master mode; and at least one human-machine interface device 100 is configured in the slave mode. In an alternative embodiment of the present invention, the arbitration module is configured to receive user inputs from a user with regard to a desired mode on each human-machine interface device 100 in the device cluster. The user inputs may be received through a user prompt on a user interface displayed to the user. Alternatively, a mode-selection switch may be provided such that the user may set or reset the switch to enable the master and the slave modes respectively. It should be noted that several variation are possible with regard to receiving the user inputs in this regard and all such variations are well within the scope of the present invention.

Each human-machine interface device 100 further includes the control module 306. The control module 306 is operable in two modes, i.e., a master mode and a slave mode depending on the mode configured by the arbitration module 304. In the master mode, the control module 306 controls one or more hardware resources 102 on one or more human-machine interface devices 100 within said device cluster. On the other hand, in the slave mode, the control module 306 receives control signals from another control module 306 operating in the master mode on another human-machine interface device 100 within said device cluster. Thus, the individual control modules 306 running on individual human-machine interface devices 100 are organized in a two-level hierarchy.

It should be noted that in case two or more control modules 306 are operating in the master mode within a single device cluster, individual hardware resources are shared between such control modules 306 based on a resource locking and release procedure. Thus, for example, if a processor on one of the human-machine interface devices 100 is to be used as a co-processor along with a native processor by a control module 306, the control module 306 will first create a lock on that processor such that no other control module 306 is able to access that processor. Once the desired operation has been successfully completed, the control module 306 will remove the lock on said processor, thereby releasing the processor such that the processor is available for use by another control module 306.

It should further be understood that a first human-machine interface device 100a operating in the master mode may be connected to a second human-machine interface device 100b operating in slave mode through another human-machine interface device 100c. In this case, in terms of the logical hierarchy, the human-machine interface device 100b is directly a slave to the human-machine interface device 100a; however, the communication channel is via the human-machine interface device 100c.

The display module 308 is also operable in two modes, i.e., a master mode and a slave mode. In the master mode, the display module 308 logically partitions a graphical user-interface into two or more portions. The individual portions are then provided to one or more display modules 308 operating in the slave mode on other human-machine interface devices 100 in said device cluster. Thus, a graphical user interface, meant to be displayed on a single human-machine interface device 100 is partitioned and displayed on multiple human-machine interface devices 100, thereby, significantly increasing screen resolution and enhancing user experience. In an alternative embodiment of the present invention, each display module 308 operating in the master mode, provides one or more different user interfaces to one or more display modules 308 operating in the slave mode such that multiple independent user interfaces are simultaneously displayed to the user, thereby, increasing user convenience and efficiency.

Figure 4A:
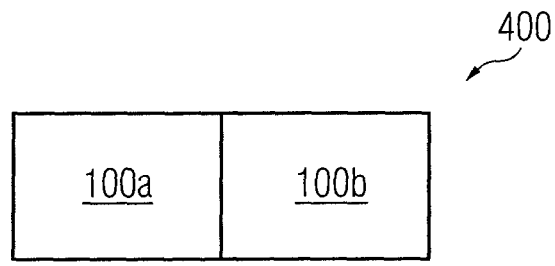
FIGS. 4A-4C illustrates three alternative arrangements of human-machine interface devices in a device cluster in accordance with an embodiment of the present invention.
Figure 4B:
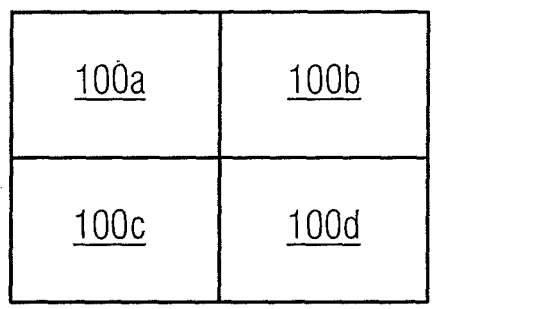
Figure 4C:
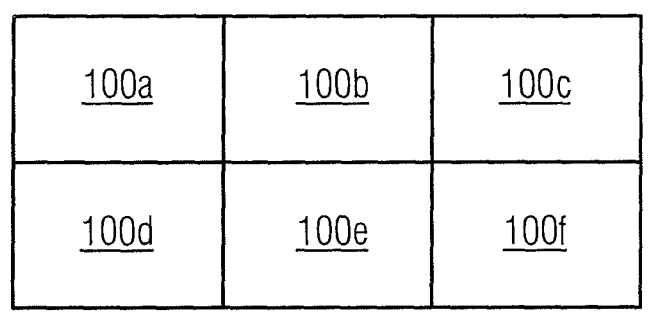

FIG. 4A-4C illustrates three alternative arrangements of human-machine interface devices 100 in a device cluster 400 in accordance with an embodiment of the present invention.

As shown in the adjoining figures, two or more human-machine interface devices 100 can be interconnected to create the device cluster 400. The size of such device cluster 400 may be decided based on user preference. The device cluster 400 not only provides much bigger display area for displaying user interfaces but also provides greatly enhanced hardware capabilities compared to individual human-machine interface devices 100.

Figure 5:
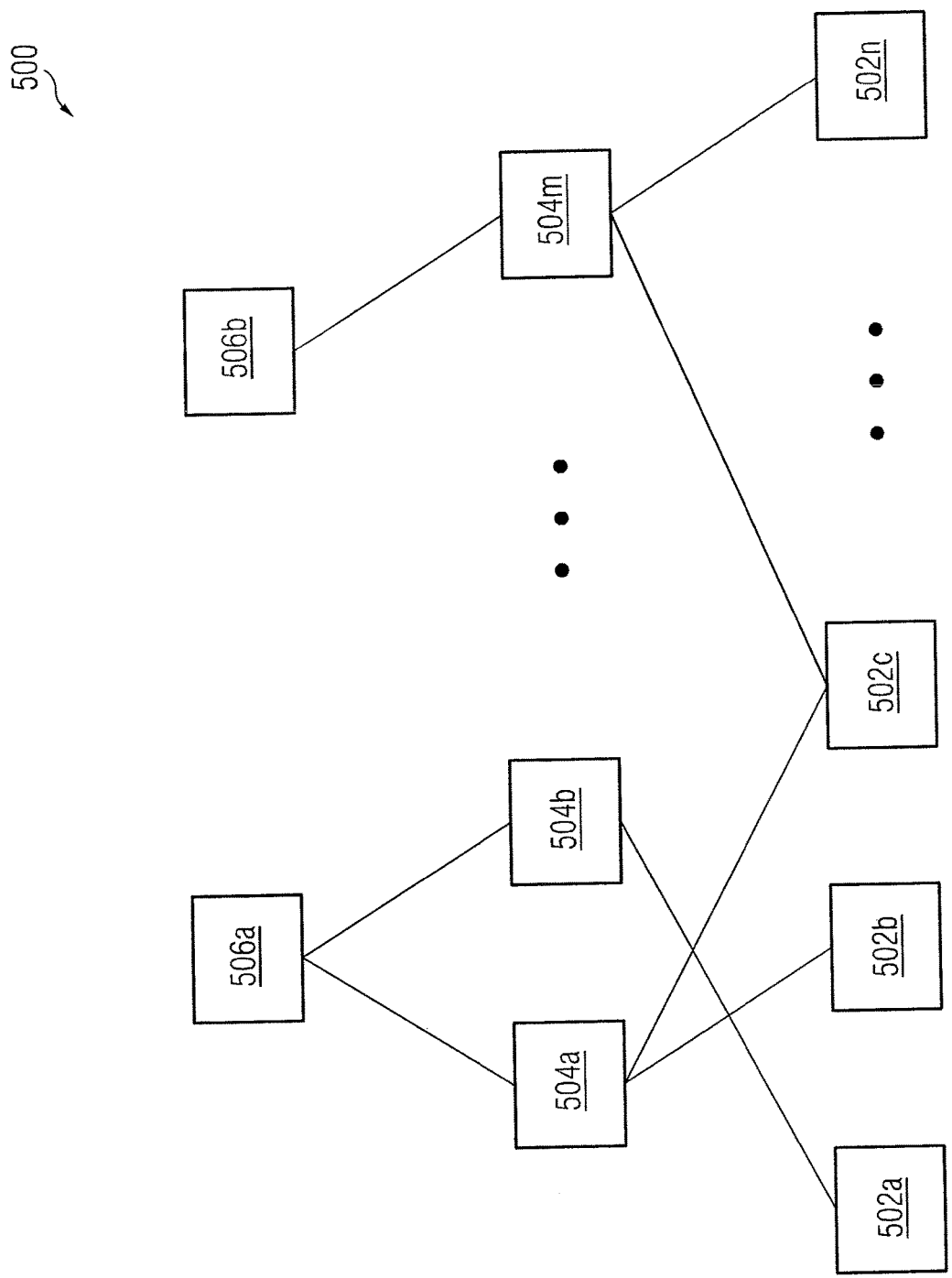
FIG. 5 illustrates an automation system including a plurality of human-machine interface devices in accordance with an embodiment of the present invention.

FIG. 5 illustrates an automation system 500 including a plurality of human-machine interface devices in accordance with an embodiment of the present invention.

The automation system 500 is a typical industrial automation system including multiple field devices 502a, 502b, 502c . . . 502n, multiple programmable-logic controllers 504a, 504b, 504c . . . 504m, and one or more human-machine interface devices 506a, 506b.

In accordance with various techniques of the present invention, two or more human-machine interface devices are interconnected to form the device cluster 400. The human-machine interface devices 506, as shown in the adjoining figure, may represent individual human-machine interface devices 100 or device clusters 400, or a combination thereof.

Figure 6:
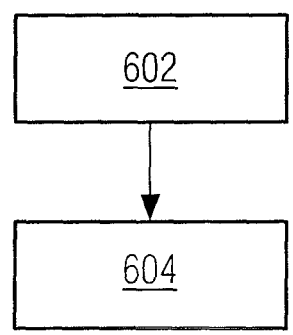
FIG. 6 illustrates a flowchart of a method for operating an automation system in accordance with an embodiment of the present invention.

FIG. 6 illustrates a flowchart of a method for operating an automation system in accordance with an embodiment of the present invention.

As explained in the foregoing description, the automation system includes a plurality of human-machine interface devices. Each human-machine interface device includes one or more hardware resources and a system bus providing a communication channel between the one or more hardware resources within the human-machine interface device.

At step 602, at least one human-machine interface device is interconnected to at least one other human-machine interface device such as to form a device cluster.

At step 604, a communication channel between the system bus in each of the human-machine interface devices is provided. As explained in conjunction with preceding figures, where the communication channel is providing through use of an interconnect circuit, which includes an interconnect port and means for providing a communication channel between the interconnect port and the system bus. Such means includes an interconnect bus and an interconnect bridge.

Figure 7:
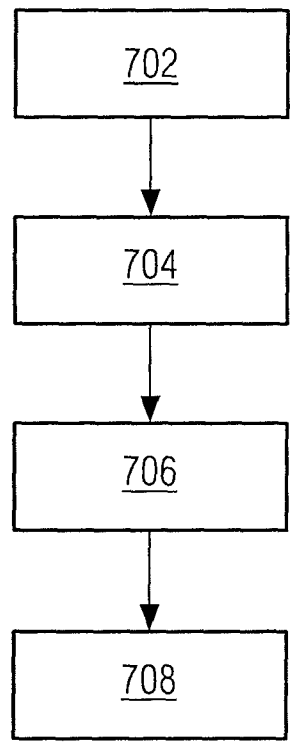
FIG. 7 illustrates a flowchart of a method for operating an automation system in accordance with an alternative embodiment of the present invention.

FIG. 7 illustrates a flowchart of a method for operating an automation system in accordance with an alternative embodiment of the present invention.

The steps 702 and 704 are similar to steps 602 and 604 explained in conjunction with FIG. 6.

At step 706, one of a master mode and a slave mode is activated in the human-machine interface device. At this step, the master and the slave modes are activated in the human-machine interface devices such that one or more human-machine interface devices are configured in the master mode, and each of the remaining human-machine interface devices in the device cluster are configured in the slave mode.

At step 708, one or more human-machine interface device are operated in the master mode while each of the remaining human-machine interface devices in the device cluster are operated in the slave mode. The human-machine interface devices operating in the master mode control the one or more hardware resources operating in the slave mode within each human-machine interface device in the device cluster. The human-machine interface devices operating in the slave mode are controlled based on one or more control signals received from the one human-machine interface device operating in the master mode within said device cluster.

Thus, the present invention provides scalable architecture for a human-machine interface device. The human-machine interface device according to the present invention is configured for interconnection with one or more other human-machine interface devices to form a device cluster. Various hardware resources in the device cluster are controlled in a coordinated manner to achieve enhanced hardware capabilities in a cost-effective manner.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A human-machine interface device of an industrial automation system comprising a plurality of programmable-logic controllers and a plurality of the human-machine interface devices, the human-machine interface device comprising:
   at least one hardware resource;
   a system bus for providing a communication channel between the at least one hardware resource within a human-machine interface device of the industrial automation system including the plurality of programmable-logic controllers;
   an interconnect circuit comprising at least one interconnect port configured for interconnecting the human-machine interface device to at least one other human-machine interface device to form a device cluster;
   means for providing a communication channel between the at least one interconnect port and the system bus; and
   a discovery module configured to retrieve information related to one of (i) processor type, (ii) processor capacity and (iii) memory capacity of the at least one hardware resource in at least one other human-machine interface device in the device cluster which facilitates an arbitration process so as to configure different modes associated with the human-machine interface device and the at least one other human-machine interface device.

2. The human-machine interface device according to claim 1, wherein the means for providing a communication channel comprise:
   an interconnect bus configured to provide a communication channel between at least one interconnect port corresponding to the human-machine interface device; and
   an interconnect bridge configured to provide a communication channel between the interconnect bus and the system bus within the human-machine interface device.

3. The human-machine interface device according to claim 1, wherein the interconnect circuit is configured for communicating at least one of multiplexed address/data signals, controls signals and interrupt signals.

4. The human-machine interface device according to claim 2, wherein the interconnect circuit is configured for communicating at least one of multiplexed address/data signals, controls signals and interrupt signals.

5. The human-machine interface device according to claim 1, further comprising:
   an arbitration module configured to activate one of a master mode and a slave mode in the human-machine interface device such that at least one human-machine interface device of the plurality of human-machine interface devices in the device cluster is configured in the master mode, and each remaining human-machine interface device in the plurality of human-machine interface devices in the device cluster is configured in the slave mode.

6. The human-machine interface device according to claim 1 further comprising:
   a control module operable in a master mode for controlling at least one hardware resource on at least one human-machine interface device within the device cluster, and further operable in a slave mode for receiving control signals from another control module operating in a master mode on another human-machine interface device within the device cluster.

7. The human-machine interface device according claim 1 further comprising:
   a display module operable in a master mode for logically partitioning a graphical user-interface into a plurality of portions, and for displaying individual portions on individual human-machine interface devices in the device cluster.

8. An industrial automation system comprising:
   a plurality of programmable-logic controllers; and
   a plurality of human-machine interface devices, each of the plurality of human-machine interface devices comprising:
   at least one hardware resource;
   a system bus configured to provide a communication channel between the at least one hardware resource within the human-machine interface device of the industrial automation system;
   an interconnect circuit comprising at least one interconnect port configured to interconnect the at least one human-machine interface device to at least one other human-machine interface device to form a device cluster;
   means for providing a communication channel between the at least one interconnect port and the system bus; and
   a discovery module configured to retrieve information related to one of (i) processor type, (ii) processor capacity and (iii) memory capacity of at least one hardware resource in at least one other human-machine interface device in the device cluster which facilitates an arbitration process so as to configure different modes associated with the human-machine interface device and the at least one other human-machine interface device.

9. The industrial automation system according to claim 8, wherein the human-machine interface device further comprises:
   an arbitration module configured to activate one of a master mode and a slave mode such that at least one human-machine interface device of the plurality of human-machine interface devices in the device cluster is configured in a master mode, and each remaining human-machine interface human-machine interface device of the plurality of human-machine interface devices in the device cluster is configured in a slave mode.

10. The industrial automation system according to claim 8, wherein the human-machine interface device further comprises:
   a control module operable in a master mode for controlling the at least one hardware resource on at least one human-machine interface device of the plurality of human-machine interface devices within the device cluster, and further operable in a slave mode for receiving control signals from another control module on another human-machine interface device of the human-machine interface devices operating in a master mode within said device cluster.

11. The industrial automation system according to claim 8, wherein the human-machine interface device further comprises:
   a display module operable in a master mode for logically partitioning a graphical user-interface into a plurality of portions, and for displaying individual portions on individual human-machine interface devices in the device cluster.

12. A method for operating an industrial automation system comprising a plurality of programmable-logic controllers and a plurality of human-machine interface devices, each of the plurality of human-machine interface devices of the industrial automation system comprising at least one hardware resource and a system bus configured to provide a communication channel between the at least one hardware resource within the plurality of human-machine interface devices of the industrial automation system, the method comprising:
   interconnecting at least one human-machine interface device of the plurality of human-machine interface devices of the industrial automation system including the plurality of programmable-logic controllers to at least one other human-machine interface device of the plurality of human-machine interface device to form a device cluster;
   providing a communication channel between the system bus in each of the plurality of human-machine interface devices of the industrial automation system; and
   retrieving information related to one of (i) processer type, (ii) processor capacity and (iii) memory capacity of the at least one hardware resource in at least one other human-machine interface device in the device cluster which facilitates an arbitration process so as to configure different modes associated with each of the human-machine interface devices.

13. The method according to claim 12 further comprising:
   activating one of a master mode and a slave mode in the human-machine interface device such that at least one human-machine interface device of the plurality of human-machine interface devices is configured in the master mode, and each remaining human-machine interface device of the plurality of human-machine interface devices in the device cluster is configured in the slave mode.

14. The method according to claim 12 further comprising:
   operating at least one human-machine interface device of the plurality of human-machine interface devices in a master mode to control the at least one hardware resource within each human-machine interface device of the plurality of human-machine interface devices in the device cluster; and
   operating each remaining human-machine interface device of the plurality of human-machine interface devices in the device cluster in a slave mode based on at least one control signal received from the at least one human-machine interface device operating in the master mode within the device cluster.

* * * * *